(12) United States Patent
Porobic

(10) Patent No.: US 6,766,804 B2
(45) Date of Patent: Jul. 27, 2004

(54) METHOD OF USING CIGARETTES

(76) Inventor: Kenan Porobic, 10814 Altliff Ct., Charlotte, NC (US) 28213

( * ) Notice: Subject to any disclaimer, the term of this patent is extended or adjusted under 35 U.S.C. 154(b) by 0 days.

(21) Appl. No.: 10/158,823

(22) Filed: Jun. 3, 2002

(65) Prior Publication Data

US 2003/0230314 A1 Dec. 18, 2003

(51) Int. Cl.$^7$ .......................... A24F 11/00; A24F 47/00
(52) U.S. Cl. ........................ 131/328; 131/270; 434/236
(58) Field of Search ................................ 131/270, 328; 434/236; 206/265, 242, 276, 236

(56) References Cited

U.S. PATENT DOCUMENTS

| | | | |
|---|---|---|---|
| 2,158,971 A | 5/1939 | Stratton | 206/41 |
| 3,226,010 A | 11/1963 | Rogers, Jr. | 229/87 |
| 3,148,768 A | 9/1964 | Gatto | 206/41 |
| 3,752,308 A | 8/1973 | Begemann | 206/48.5 |
| 3,809,227 A | 5/1974 | Begemann | 206/264 |
| 4,111,638 A | * 9/1978 | Ostberg | 431/13 |
| 4,615,681 A | * 10/1986 | Schwarz | 434/236 |
| 4,784,261 A | 11/1988 | Kutchin | 206/256 |

FOREIGN PATENT DOCUMENTS

DE 38 00 028 * 7/1989 ............... 131/185

* cited by examiner

Primary Examiner—Dionne A. Walls
(74) Attorney, Agent, or Firm—Litman Law Offices

(57) ABSTRACT

A method of safely using cigarettes, utilizing the steps of obtaining a plurality of cigarettes and a safety container, placing a maximum number of the cigarettes to safely smoke per day into the safety container, distributing a maximum number of cigarettes to safely smoke per day and smoking only up to the maximum number of cigarettes to safely smoke during the day. The safety container provides instructions on how to estimate a maximum safe number of cigarettes to smoke based on the amount of nicotine in the cigarettes, the size of the cigarettes and the quality of filter used with the cigarettes. There is also a second embodiment of the method, which involves providing cigarettes that already come in a safety container with safety instructions.

6 Claims, 4 Drawing Sheets

METHOD OF USING CIGARETTES

BACKGROUND OF THE INVENTION

1. Field of the Invention

The present invention relates to a method of using cigarettes. More specifically, the invention is a method of using cigarettes in such a way as to reduce the possibility of becoming ill from the cigarettes.

2. Description of the Related Art

The tobacco industry is one of the largest and most profitable industries in the world. The tobacco industry is so large that there are many "sub-industries" that have spawned from the tobacco industry. One of these sub-industries is the packaging of the cigarettes themselves, which can utilize very sophisticated equipment and procedures. Some of packages used in the packaging of cigarettes are reflected in the related art.

U.S. Pat. No. 2,158,971 issued to Stratton, outlines a novel way of packing cigarettes and the like. A pack of two, three or more separable units, which may be easily divided from the whole, can be provided with each unit potentially being sold and used. When detached, each unit constitutes a complete package. The cigarettes in each unit, both before and after separation, are protected from damage and are maintained fresh and salable. The separate units or several units together make up a convenient package for a user's pocket or handbag.

U.S. Pat. No. 3,148,768 issued to Gatto, outlines a multi-compartment cigarette package and provides an improved cigarette package made up of a plurality of readily separable compartments. Each compartment contains approximately half a dozen cigarettes, wherein the complete package includes preferably three compartments, although it may include less or more, with the three compartments being approximately the size of a conventional pack of cigarettes.

U.S. Pat. No. 3,226,010 issued to Rogers Jr., outlines a cigarette package having separate dual compartments, whereby a manufacturer may offer for sale, and a smoker may purchase, a standard size of cigarette package, but from the separate compartments he may select different types of cigarettes.

U.S. Pat. No. 3,752,308 issued to Begemann, outlines the provision of packaging smaller than standard-size cigarette packages in a special carton adapted for transport along a travel path through a tax marking machine designed for tax marking standard-size cigarette packages contained in a standard-size carton.

U.S. Pat. No. 3,809,227 issued to Begemann, outlines cigarette packages that are wrapped in an aligned single row or assembly of five such packages, so that two such wrapped assemblies can be placed side-by-side in a conventional carton, making a unit sale of five prepackaged packages possible if desired.

U.S. Pat. No. 4,784,261 issued to Kutchin, outlines a cigarette package which is provided having a desired number of individual packets which are wrapped by a clear cellophane wrapper to provide a single package. Each of the individual packets contains a predetermined quantity of cigarettes. An advertising card is provided between the individual packets, which in turn forms a part of the completed package upon wrapping of the package itself.

Although each of the patents describe the use of a functional package for cigarettes, what would really be useful would be a package that could provide smokers with instructions on how to use cigarettes safely, which would complement any health warnings concerning the use of cigarettes. The method for safely using cigarettes could be a standard which can indicate the maximum number of cigarettes that can be smoked by a person during a given period of time. Such a method of using cigarettes could save thousands of lives and revolutionize the tobacco industry.

None of the above inventions and patents, taken either singularly or in combination, is seen to describe the instant invention as claimed. Thus a method of using cigarettes solving the aforementioned problems is desired.

SUMMARY OF THE INVENTION

The invention is a method of safely using cigarettes, utilizing the steps of obtaining a plurality of cigarettes and a safety container, placing a maximum number of the cigarettes to safely smoke per day into the safety container, distributing a maximum number of cigarettes to safely smoke per day and smoking only up to the maximum number of cigarettes to safely smoke during the day. The safety container provides instructions on how to estimate a maximum safe number of cigarettes to smoke based on the amount of nicotine in the cigarettes, the size of the cigarettes and the quality of filter used with the cigarettes. There is also a second embodiment of the method, which involves providing cigarettes that already come with a safety container with safety instructions.

Accordingly, it is a principal object of the invention to provide a method of using cigarettes that is safe and leaves a user free from cigarette related disease.

It is another object of the invention to utilize a method of using cigarettes that establishes a safe maximum number of cigarettes that can be used in a given period of time by a user.

It is a further object of the invention to provide a method of using cigarettes that limits excessive use of cigarettes.

Still another object of the invention is to provide a method of using cigarettes that complements the Surgeon General's warning regarding cigarettes.

It is an object of the invention to provide improved elements and arrangements thereof for the purposes described which is inexpensive, dependable and fully effective in accomplishing its intended purposes.

These and other objects of the present invention will become readily apparent upon further review of the following specifications and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
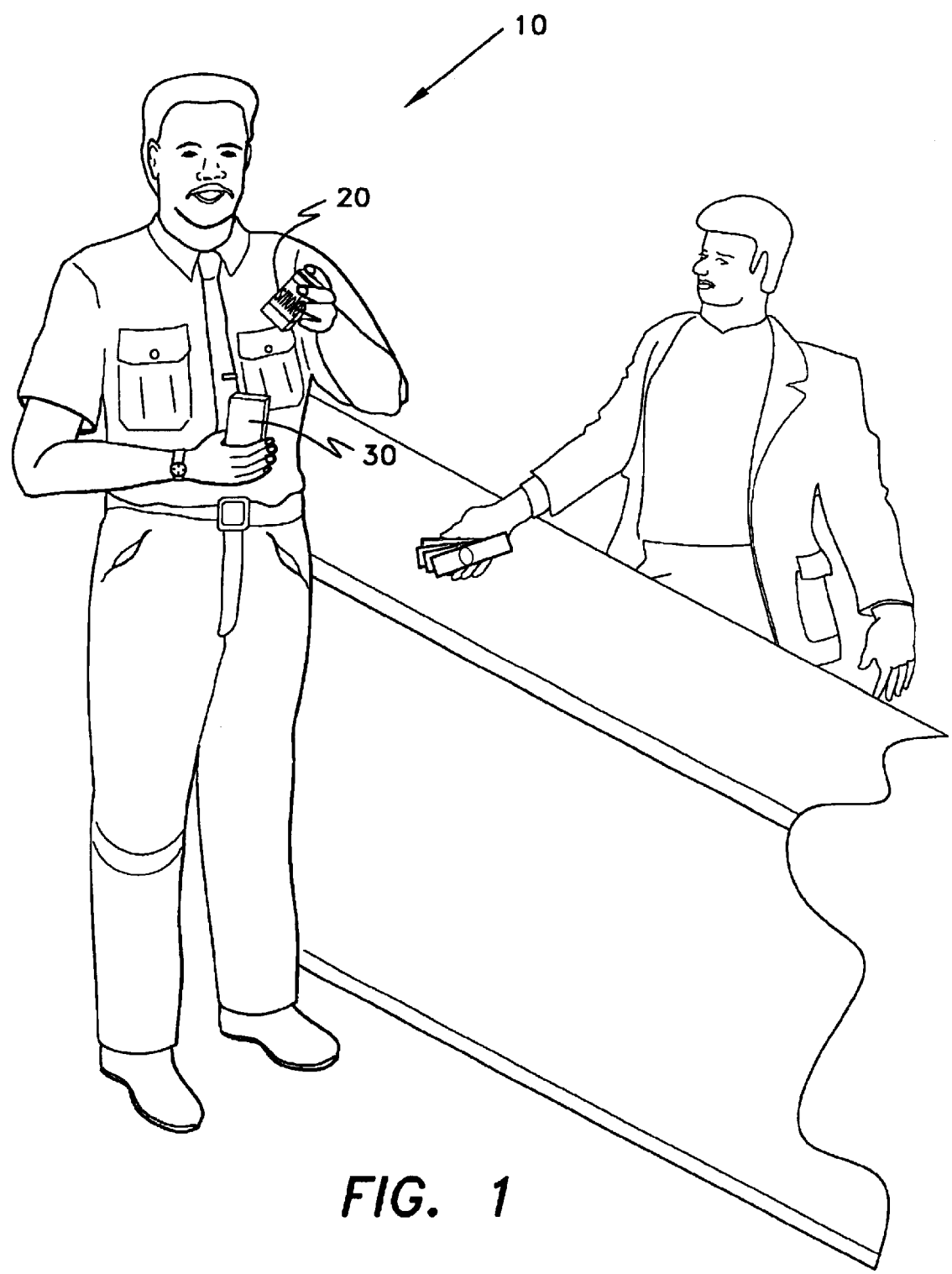
FIG. 1 is an environmental, perspective view of a user utilizing a first embodiment of a method of using cigarettes.
Figure 3:
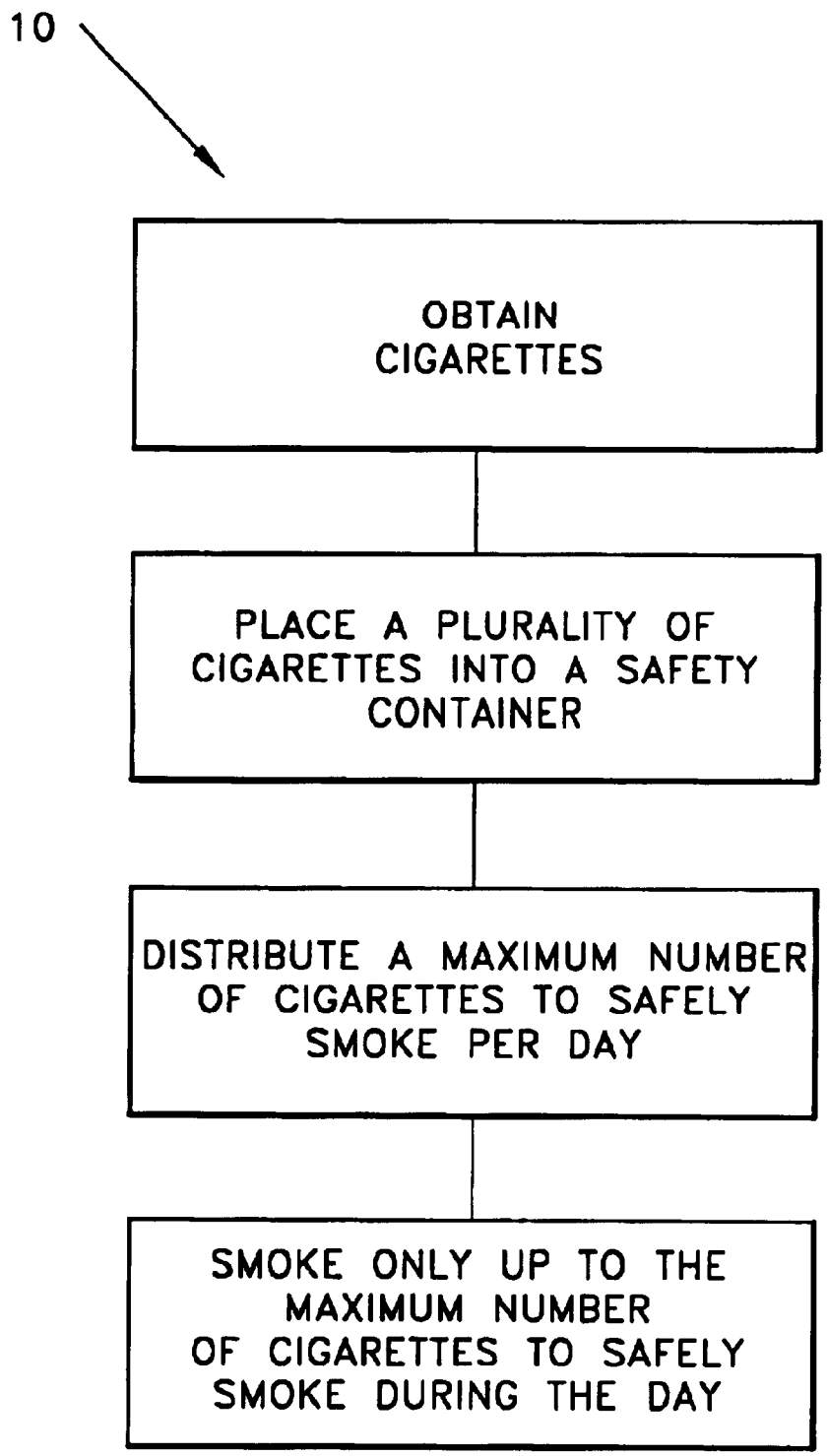
FIG. 3 outlines the steps of the first embodiment of a method of using cigarettes.

The present invention shows the first embodiment of a method of using cigarettes 10, as depicted in FIG. 1. The first embodiment of a method of using cigarettes 10 comprises the steps of obtaining a plurality of cigarettes 20, placing a maximum number of the cigarettes 20 to safely smoke per day into a safety container 30, distributing a maximum number of cigarettes 20 to safely smoke per day and smoking only up to the maximum number of cigarettes 20 to safely smoke during the day. These steps are also outlined in FIG. 3.

The first embodiment pertains to a smoker who will purchase a plurality of cigarettes 20 and have a separate safety container 30, that is purchased before the smoker buys the cigarettes 20. Once the cigarettes 20 are purchased, they are immediately put into the safety container 30, which holds between 1 and 19 regular sized cigarettes 20. The safety container 30 warns against smoking more than the maximum number of cigarettes 20 to safely smoke per day. A smoker can safely smoke between an estimated 1–19 cigarettes 20 per day. The estimated maximum number of cigarettes 20 to safely smoke per day depends on the amount of nicotine in the cigarettes 20, the quality of a cigarette filter used with the cigarettes 20 and the size of the cigarettes 20. A person can smoke more low nicotine cigarettes 20 than high nicotine cigarettes 20, smoke more cigarettes 20 with high quality filters than cigarettes 20 with low quality filters and smoke more small cigarettes 20 than large cigarettes 20.

For example, a smoker can safely smoke approximately 15–19 small, low nicotine cigarettes 20 with high quality filters. The smoker can also safely smoke approximately 1–5 large, high nicotine cigarettes 20 with low quality filters (or with no filters at all). The smoker must estimate the approximate number of cigarettes 20 per day that he or she can safely smoke. This is based on the principle that people have a tolerance for tobacco and that each person's threshold is based on the size of the cigarettes 20 smoked, the nicotine content of the cigarettes 20 and the presence and quality of filter provided with the cigarettes 20.

These instructions (method steps) are printed on the outside of the safety container 30 and serve as a constant remainder of how to safely smoke the cigarettes 20 that are stored inside. The safety container 30 can hold as many as 20 cigarettes 20 (one standard pack) at one time to hold at least 1 full day's worth of small, low nicotine cigarettes 20 with high quality filters.

Figure 2:
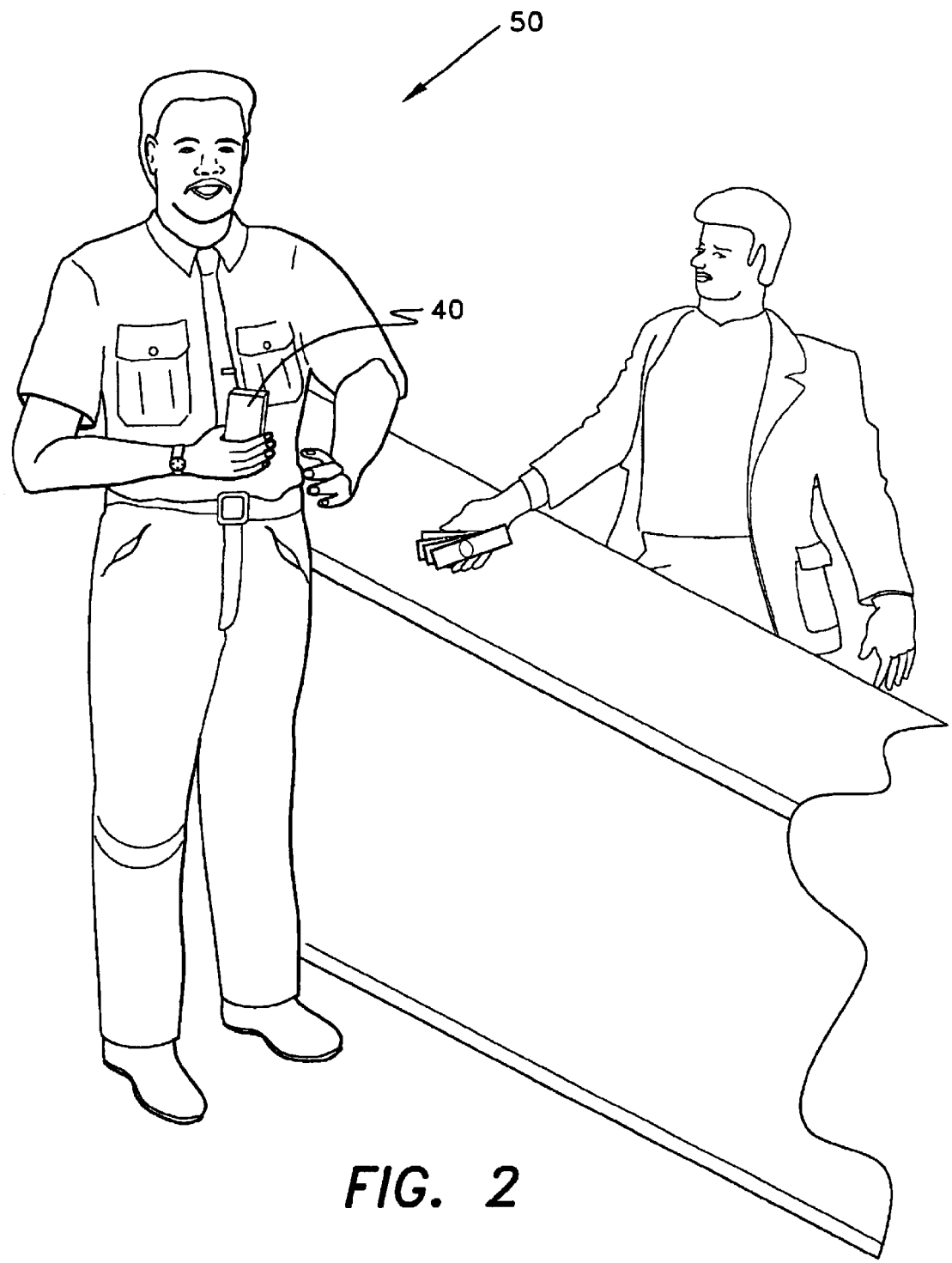
FIG. 2 is an environmental, perspective view of a user utilizing a second embodiment of a method of using cigarettes.

There is a second embodiment for a method of using cigarettes 50, which involves buying cigarettes 20 that are already packaged a safety container 30 with similar instructions on the safety container 30 on how to safely use the cigarettes 20, as is shown on FIG. 2. The first embodiment and second embodiment are equally effective in actually allowing smokers to safely smoke cigarettes 20.

Figure 4:
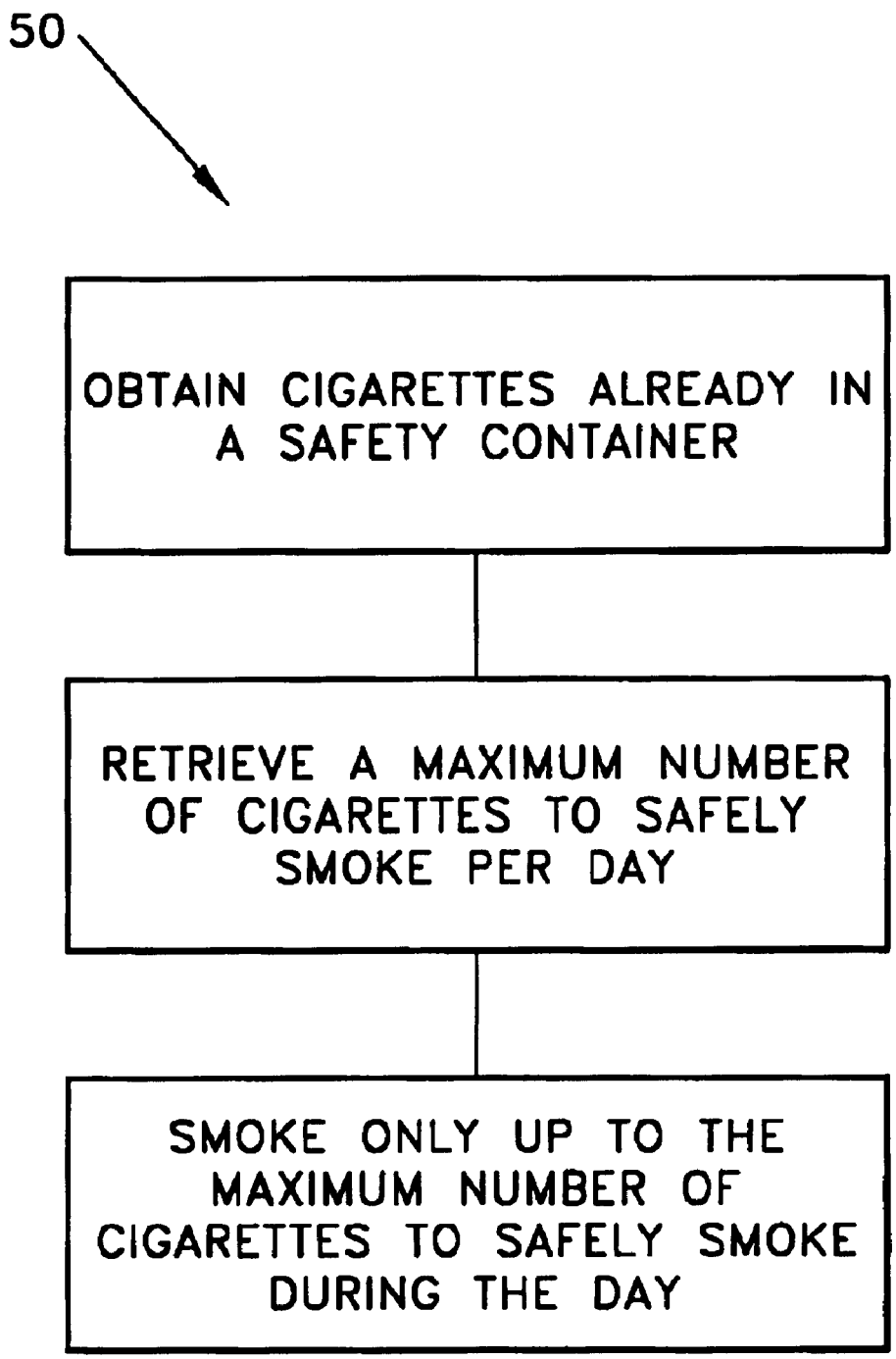
FIG. 4 outlines the steps of the second embodiment of a method of using cigarettes.

The second embodiment for a method of using cigarettes 50, comprises the steps of obtaining a plurality of cigarettes 20 already provided in a safety container 30, with the maximum number of the cigarettes 20 to safely smoke per day being contained in the safety container 30, distributing a maximum number of cigarettes 20 to safely smoke per day and smoking only up to the maximum number of cigarettes 20 to safely smoke during the day. These steps are outlined in FIG. 4.

Like the first embodiment, the safety container 30 warns against smoking more than the maximum number of cigarettes 20 to safely smoke per day. As previously discussed, a smoker can safely smoke between an estimated 1–19 cigarettes 20 per day. The estimated maximum number of cigarettes 20 to safely smoke per day depends on the amount of nicotine in the cigarettes 20, the quality of a cigarette filter used with the cigarettes 20 and the size of the cigarettes 20. A person can smoke more low nicotine cigarettes 20 than high nicotine cigarettes 20, smoke more cigarettes 20 with high quality filters than cigarettes 20 with low quality filters and smoke more small cigarettes 20 than large cigarettes 20.

Both embodiments are similar in that they use the same safety container 30 and instructions and are based on the idea of people having a built-in tolerance and threshold against cigarette related illnesses. Both embodiments can also be used for a variety of different types and brands of cigarettes 20. Both embodiments require the smoker to accurately estimate the correct number of cigarettes allowed to be safely smoked and to be knowledgeable of the cigarettes' 20 size, nicotine content and quality of filter (if any) being used with the cigarettes 20.

It is to be understood that the present invention is not limited to the embodiments described above, but encompasses any and all embodiments within the scope of the following claims.

I claim:

1. A method for limiting excessive use of cigarettes, comprising the steps of:

obtaining a plurality of cigarettes and a container, said container displaying a warning discouraging the smoking of more than a specific number of cigarettes per day;

placing said specific number of cigarettes to smoke per day into said container to store the cigarettes; and smoking only up to said specific number of cigarettes per day.

2. A method for limiting excessive use of cigarettes, comprising the steps of:

obtaining a plurality of cigarettes and a container, said container displaying instructions which assist a user in estimating a maximum number of cigarettes to smoke per day based on the amount of nicotine in the cigarettes, the quality of a cigarette filter used with the cigarettes and the size of the cigarettes;

placing said maximum number of the cigarettes to smoke per day into said container to store the cigarettes; and smoking only up to said maximum number of cigarettes per day.

3. A method for limiting excessive use of cigarettes, comprising the steps of:

obtaining a plurality of cigarettes and a container, said container displaying instructions which assist a user in estimating a maximum number of a particular type of cigarette to be smoked per day;

placing said maximum number of the cigarettes to smoke per day into said container to store the cigarettes; and smoking only up to said maximum number of cigarettes per day.

4. A method for limiting excessive use of cigarettes, comprising the steps of:

obtaining a plurality of cigarettes already provided in a container, said container displaying a warning discouraging the smoking of more than a specific number of cigarettes per day; and smoking only up to said specific number of cigarettes per day.

5. A method for limiting excessive use of cigarettes, comprising the steps of:

obtaining a plurality of cigarettes already provided in a container, said container displaying instructions which assist a user in estimating a maximum number of cigarettes to smoke per day based on the amount of nicotine in the cigarettes, the quality of a cigarette filter used with the cigarettes and the size of the cigarettes; and smoking only up to said maximum number of cigarettes per day.

6. A method for limiting excessive use of cigarettes, comprising the steps of:

obtaining a plurality of cigarettes already provided in a container, said container displaying instructions which assist a user in estimating a maximum number of a particular type of cigarette to be smoked per day; and smoking only up to said maximum number of cigarettes per day.

* * * * *